June 28, 1932. C. ANDERSON 1,865,071
CHECK PROTECTOR FOR POCKET CHECK BOOKS
Filed Oct. 6, 1930
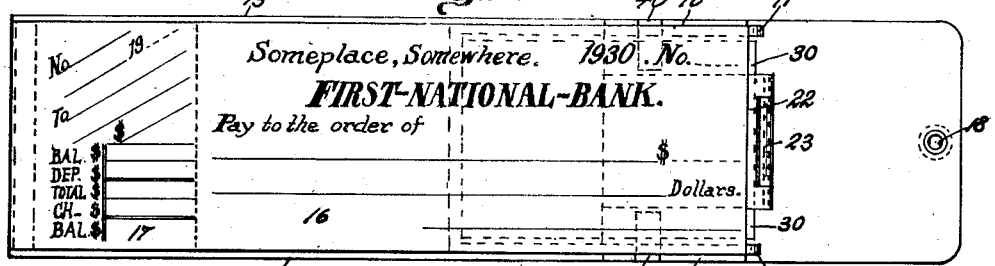
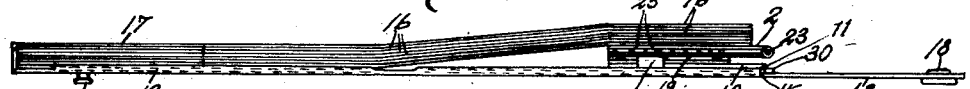
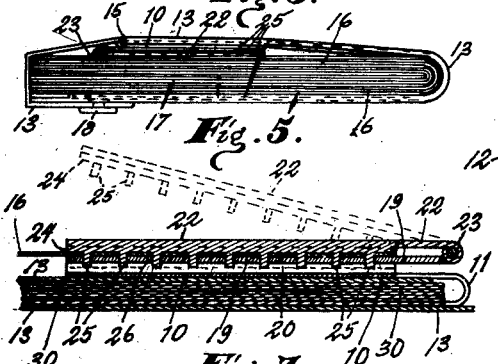
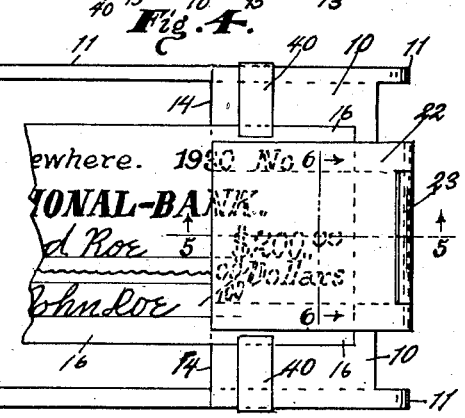
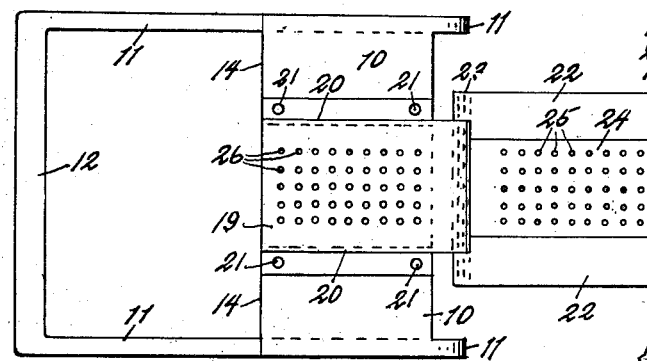
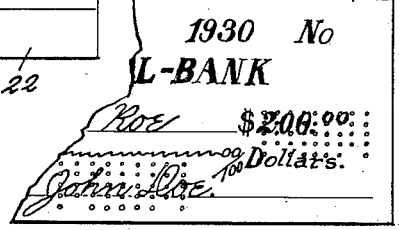
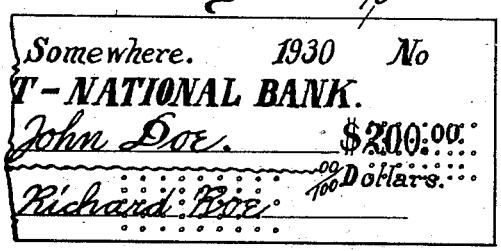
Inventor.
Church Anderson.
By
Lockwood & Lockwood
His Attorneys.

Patented June 28, 1932

1,865,071

UNITED STATES PATENT OFFICE

CHURCH ANDERSON, OF LOS ANGELES, CALIFORNIA

CHECK PROTECTOR FOR POCKET CHECK BOOKS

Application filed October 6, 1930. Serial No. 486,577.

This invention relates to a simple means for preventing persons from easily altering names, dates or the amount of values on checks or other valuable papers, and the principal object is to provide an exceedingly light weight check perforator that is easy to construct, assemble and operate, and that also is detachably connected to a pocket check book so it is always available and ready to use whenever a check is to be made out and signed. To that end I provide a check perforator that can be detachably connected to a pocket check book so it folds inside of the book so as to be carried with it ready for use when a check or other valuable paper is to be signed, dated and the amount of its value indicated in figures. That is, after a check, note or valuable paper is written the signature and figure spaces can be simultaneously perforated so the name and amount thereon cannot be easily changed.

Another object is to provide a check perforator that, in addition to protecting signatures and the like from being altered or forged, can also be used to identify the person signing the checks. To that end I provide a perforator with a large number of spaced plungers, one or more of which can be omitted from various devices to identify the owner to the bank cashier, it being understood that the cashier will be informed as to the positions of the other plungers relative to those missing. That is, he can have a chart of the perforations made by the numerous devices, together with the owner's signature so that when a check is presented having the wrong perforations the cashier will know that something is wrong, probably a forgery.

Features of invention are shown in the construction, combination and arrangement of parts whereby a check perforator is provided that is easy to construct, install and operate, and which is neat and pleasing in appearance and effective and durable in use.

A feature of invention is shown in the means for detachably connecting the check perforator to a pocket check book so that when the book is worn out the check perforator can be detached and connected to a new book.

Other objects, advantages and features of invention may appear from the accompanying drawing, the subjoined detail description and the appended claims.

The accompanying drawing illustrates the invention, in which:

Figure 1 is a plan view of a folding pocket check book open ready for use showing a check perforator arranged therein that is constructed in accordance with this invention.

Fig. 2 is an edge view of the book and check perforator shown in Fig. 1 with parts indicated semidiagrammatically, it being understood that the sheets of paper are much thinner than shown in the drawing and the check perforator is indicated diagrammatically.

Fig. 3 is a view analogous to Fig. 2 with the check book folded over the check perforator.

Fig. 4 is a plan view of the check perforator detached from the check book and showing a portion of a check arranged in position to be perforated.

Fig. 5 is an enlarged fragmental section on the line 5—5, Fig. 4, showing a check perforated, and also indicating by dotted lines the plunger plate moved out of contact with the check after it has been perforated.

Fig. 6 is an enlarged fragmental cross section on the line 6—6, Fig. 4, showing a check perforated and also showing the perforated plate raised above the base plate to provide a space for the waste paper.

Fig. 7 is a plan view of the check perforator detached from the check book, showing the plunger plate moved to a full open position.

Fig. 8 is a fragmental plan view of a filled-in check perforated on both the signature and the amount of value, and also showing two blank spaces in the lower horizontal line of perforations to indicate to a bank cashier that the signature and punctures were made by the proper person or by the fictitious person, John Doe.

Fig. 9 is a view analogous to Fig. 8 showing two blank spaces in the last line of perforations to indicate to a bank cashier that the signature and punctures were made by the proper person or by the fictitious person Richard Roe.

The check perforator includes a base plate 10 that with the edge guides 11 and cross bar 12 are stamped out of sheet metal which preferably can be colored the same as the color of the folding pocket check book 13 to which it is attached, it being understood, of course, that the parts associated with the plate 10 will also be of the same color.

The edge guides 11 are parallel and are first extended for a short distance in the same plane as the plate 10, then they are turned down at a right angle for a distance about the thickness of an ordinary pocket size bank pass book, then these guides are again bent so they extend under and parallel with the plate 10 and some distance beyond its edge 14 so that when these guides 11 and cross bar 12 are inserted in a pocket 15 of the check book 13 they will hold the plate securely in place and are removable so that when one book is worn out the check perforator can be easily transferred to a new book. When the check perforator is so connected to the book 13 it is enclosed inside of the book when the latter is folded, as indicated in Fig. 3.

The folding book 13 is old and is shown provided with the usual blank check pad with check 16 and stubs 17; and also is shown provided with the usual snap catch 18. A perforated plate 19 is provided with side flanges 20 that are secured by rivets 21 to the plate 10, the flanges being arranged so as to support the plate 19 a sufficient distance above the plate 10 to form a clearance for the waste paper that is punched out of the checks 16.

A plunger plate 22 is pivotally connected by a hinge 23 to the rear edge of the raised perforated plate 19, and the plate 22 is provided with a block 24 that carries a plurality of spaced plungers 25 that are arranged to register with the spaced holes 26 that extend through the raised plate 19.

The block 24 can be secured to the plate 22 in any well known way, as by brazing. It is understood that if desired the plungers can be connected directly to the plate 22, but for convenience in securing the plungers in a proper position to register with the holes 26 they are preferably secured to a block, as shown.

In Fig. 5, in addition to showing a check 16 perforated I also show an edge guide 11 extended into a pocket 15 of the book 13 so as to leave a space for the usual bank pass book 30, the top edge of which is shown in Fig. 1 arranged between the guides 11. As Figures 1, 2 and 3 are drawn to a very small scale the parts are indicated semi-diagrammatically and the detailed construction of the check perforator is very fully and clearly shown in Figs. 4 to 7 inclusive. If desired the perforator can be provided with side clips 40 to hold down the edges of the check while being perforated, as shown in Fig. 4, but preferably the device is constructed without them, as shown in Fig. 7.

Preferably there are five rows of holes in the plate 19, with nine holes in each row, it being understood that there can be more or less if so desired, and ordinarily there is a plunger 25 for each of the holes 26 except where one or more of the plungers are omitted as a means of identifying to a bank cashier a proper signature and perforations to a check. In other words by omitting one or more of the plungers in different rows and places in the rows a very large number of combinations of perforations can be arranged on a chart opposite the signatures of the bank depositors that can be kept convenient for the cashier to see when checks are presented for payment so he can readily discover if the signatures and perforations are made by the right persons, as illustrated in Figs. 8 and 9.

In Fig. 8 it is assumed that John Doe has a check perforator with two missing plungers in the bottom horizontal row so that when he signs and perforates a check the bottom row of perforations will contain seven instead of nine and the missing perforations will be adjacent opposite ends of the row. It is obvious that if a check signed by John Doe came in with a full bottom row of perforations or with the perforations arranged differently from the chart record of his check perforations a cashier would readily know that there was something wrong with the check.

This means of check identification is further illustrated in Fig. 9 in which Richard Roe's check perforator is indicated as having two plungers missing in the last vertical row of perforations. Instead of being five perforations as are in the other vertical rows there are only three. It is obvious that a very large number of identifying combinations such as shown can be arranged by omitting the plungers in various rows and places therein.

In use the check perforator is detachably secured in a check book as shown so that when a check 16 is made it can first be detached from the stub 17 and then the signature and amount of value can be easily and quickly perforated by placing the check in a proper position between the raised punctured plate 19 and plungers 25 so that a light pressure or stroke of a hand will drive the plungers through the check. With a check so punctured or perforated it will practically be impossible to alter the amount of value or change the signature.

While the perforator is especially designed for protecting checks it is understood that it is equally useful for preventing alterations of dates, signatures and amounts of value in wills, deeds, notes and other commercial papers.

I claim as my invention:

1. A check perforator including a base plate, edge guides having one of their ends integral with said plate and turned under so they are parallel with said plate and having a cross bar connecting the outer ends of said guides so they are insertible in a pocket of a folding pocket check book to detachably secure said perforator and book together, a perforated plate secured to said base plate that has spaced holes therethrough, and a plunger plate pivotally connected to said perforated plate so its plungers are movable to enter the holes in said perforated plate to perforate a check in the signature and figure spaces thereof so the signature and the amount of value thereon cannot be easily changed.

2. A check perforator including a sheet metal base plate, edge guides having ends integral with said plate, said guides first extended from said plate in the same plane and then turned downward at a right angle and then rearwardly so they are under and parallel with said plate, a cross bar integral with the other ends of said guides, said guides and cross bar constructed and arranged so they can be inserted in a check-book pocket without interfering with the pass-book therein, a raised plate having flanges secured by rivets to said base plate and having rows of spaced holes therethrough, a plunger plate, said plates spaced apart to form a clearance for the waste paper, a block secured to said plunger plate, plungers on said block that are arranged in rows and spaced apart to register with the holes in said raised plate, and a hinge connecting said plunger plate to said raised plate for the purpose specified.

In witness whereof, I have hereunto affixed my signature.

CHURCH ANDERSON.